United States Patent
Kawakami et al.

(10) Patent No.: US 7,838,843 B2
(45) Date of Patent: Nov. 23, 2010

(54) CARBON NANO TUBE PROCESSING METHOD, PROCESSING APPARATUS, AND CARBON NANO TUBE DISPERSION LIQUID, CARBON NANO TUBE POWDER

(75) Inventors: Tomonori Kawakami, Hamamatsu (JP); Mitsuo Hiramatsu, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 224 days.

(21) Appl. No.: 11/373,530

(22) Filed: Mar. 13, 2006

(65) Prior Publication Data

US 2010/0254888 A1    Oct. 7, 2010

(30) Foreign Application Priority Data

Mar. 14, 2005   (JP) .................... P2005-071445

(51) Int. Cl.
G01N 23/00   (2006.01)
(52) U.S. Cl. .................. 250/432 R; 241/23; 422/198
(58) Field of Classification Search ............. 250/423 R
See application file for complete search history.

(56) References Cited

U.S. PATENT DOCUMENTS

| | | | | |
|---|---|---|---|---|
| 7,008,604 | B2* | 3/2006 | Smalley et al. | 423/447.1 |
| 7,170,052 | B2* | 1/2007 | Furutani et al. | 250/287 |
| 7,227,134 | B2* | 6/2007 | Miller et al. | 250/288 |
| 2004/0038251 | A1* | 2/2004 | Smalley et al. | 435/6 |
| 2006/0058443 | A1* | 3/2006 | Ohashi et al. | 524/496 |

FOREIGN PATENT DOCUMENTS

| | | |
|---|---|---|
| JP | 07-172807 | 7/1995 |
| JP | 2001-113159 | 4/2001 |
| JP | 2001-146409 | 5/2001 |
| JP | 2003-159700 | 6/2003 |
| JP | 2004-002156 | 1/2004 |
| WO | 2004-020086 | 3/2004 |
| WO | 2004-080586 | 9/2004 |
| WO | 2005-049213 | 6/2005 |
| WO | 2005-058480 | 6/2005 |

(Continued)

OTHER PUBLICATIONS

Yoshiaki Tamaki et al., "Tailoring Nanoparticles of Aromatic and Dye Molecules by Excimer Laser Irradiation", Applied Surface Science 168 (2000) pp. 85-88.

(Continued)

*Primary Examiner*—David A. Vanore
*Assistant Examiner*—Phillip A. Johnston
(74) *Attorney, Agent, or Firm*—Drinker Biddle & Reath LLP (57) ABSTRACT

An apparatus 1A for processing carbon nanotubes (CNTs) includes: a processing chamber 3 for housing to-be-processed liquid 2 with CNT raw material 5 to be fragmented being suspended in a solvent 4; and a pulse irradiation light source 10 for applying pulse light having a predetermined wavelength for fragmentation of the CNTs in the solvent 4 to the to-be-processed liquid 2 housed in the processing chamber 3. This achieves a method and apparatus for processing carbon nanotubes that can fragment CNTs efficiently, and carbon nanotube dispersion liquid and carbon nanotube powder produced by the same.

19 Claims, 8 Drawing Sheets

FOREIGN PATENT DOCUMENTS

| WO | 2005-082521 | 9/2005 |
|---|---|---|
| WO | 2005-092489 | 10/2005 |

OTHER PUBLICATIONS

Yoshiaki Tamaki et al., "Nanoparticle Formation of Vanadyl Phthalocyanine by Laser Ablation of Its Crystalline Powder in a Poor Solvent", J. Phys. Chem A 2002, 106, pp. 2135-2139.

Bo Li et al., "Enhancement of Organic Nanoparticle Preparation by Laser Ablation in Aqueous Solution Using Surfactants", Applied Surface Science 210 (2003) pp. 171-176.

Bo Li et al., "Surfactant Effects on Optical Absorption Spectra of Iron Phthalocyanine Nanoparticles in Water", Materials Research Bulletin 39 (2004) pp. 1265-1269.

* cited by examiner

CARBON NANO TUBE PROCESSING METHOD, PROCESSING APPARATUS, AND CARBON NANO TUBE DISPERSION LIQUID, CARBON NANO TUBE POWDER

BACKGROUND OF THE INVENTION

1. Field of the Invention

The present invention relates to a method and apparatus for processing carbon nanotubes, and carbon nanotube dispersion liquid and carbon nanotube powder produced by the same.

2. Related Background of the Invention

The applicability of the carbon nanotube (CNT) has been explored in a wide range of fields as a potential material in the nanotechnology, and has come into practical use in some fields. Although the recent development of CVD methods has allowed for mass production of CNT, the raw material thereof generally has a state of entangled CNTs. There is a problem in that CNTs in such a state can utilize only the bulk characteristics thereof. On the contrary, with the development of the application of CNT, the usage has been shifting from a bulk-based application to a unit-based one, and the need for fragmentation processing of unraveling entangled CNTs has been increasing (refer to Document 1: Japanese Patent Application Laid-Open No. Hei 7-172807, Document 2: Japanese Patent Application Laid-Open No. 2003-159700, Document 3: Japanese Patent Application Laid-Open No. 2004-2156, and Document 4: Japanese Patent Application Laid-Open No. 2001-146409).

SUMMARY OF THE INVENTION

As for CNT fragmentation, there are processing methods as described in Documents 1 to 4. For example, in Documents 1 and 2, CNTs are exposed to ion beams or electron beams to be cut off. However, such methods have problems, though having a high capability of cutting arbitrary positions of the CNTs, that the cutting process is limited to the vicinity of the surface that can be exposed, and that only the cutting process cannot improve the state of entangled CNTs.

In Document 3, there is also described a processing method of exposing CNTs to ultrasonic waves in a conjugated polymer solution to exfoliate the entangled CNTs into separate CNTs. However, such a method has a low capability of cutting tubes, resulting in requiring a long time for CNT fragmentation, though having an effect of improving the bundle state of CNTs. There is a further problem in that the length of CNT fragments obtained through a breaking process fluctuates significantly due to low CNT breakage controllability. Also, in Document 4, there is described a method of applying physical energy to unrefined CNTs using a laser beam to remove chip portions of the CNTs. However, such a method is also insufficient to fragment the entire CNTs under the size of an irradiation spot, though capable of cutting CNTs at a specific position while damaging the size of the irradiation spot.

The present invention has been made to solve the above-described problems, and an object thereof is to provide a method and apparatus for processing carbon nanotubes that can fragment CNTs efficiently, and carbon nanotube dispersion liquid and carbon nanotube powder produced by the same.

The present inventors have made a study regarding CNT fragmentation as mentioned above to consequently find that based on the excellent suitability between carbons and light with respect to interaction and the dependence property of the interaction between a substance and light on the size of the substance, CNTs can be fragmented selectively in the length direction thereof by applying pulse light, and then reached the present invention.

That is, a method for processing carbon nanotubes according to the present invention includes the steps of: preparing to-be-processed liquid with carbon nanotubes as raw material being suspended in a solvent; and fragmenting the carbon nanotubes in the solvent in the length direction thereof by exposing the to-be-processed liquid to pulse light having a predetermined wavelength.

An apparatus for processing carbon nanotubes according to the present invention includes a processing chamber for housing to-be-processed liquid with carbon nanotubes as raw material being suspended in a solvent; and an irradiation light source for applying pulse light having a predetermined wavelength for fragmentation of the carbon nanotubes in the solvent to the to-be-processed liquid housed in the processing chamber.

In accordance with such a method and apparatus for processing carbon nanotubes (CNTs) as mentioned above, to-be-processed liquid containing CNT raw material to be fragmented is exposed to pulse light to perform CNT fragmentation processing. This allows for efficient fragmentation of the CNT raw material.

Also, dispersion liquid according to the present invention is provided with CNTs processed and fragmented by the above-described processing method being dispersed in the solvent. In accordance with such dispersion liquid, it is possible to obtain dispersion liquid of efficiently processed CNT fragments in an excellent state.

Also, CNT powder according to the present invention is processed by the above-described processing method with the solvent, etc., being removed therefrom. In accordance with such powder, it is possible to obtain powder of efficiently processed CNT fragments in an excellent state.

In accordance with the present invention, to-be-processed liquid containing CNT raw material to be fragmented is exposed to pulse light to perform CNT fragmentation processing, whereby it is possible to achieve a method and apparatus for processing carbon nanotubes that can fragment CNTs efficiently, and carbon nanotube dispersion liquid and carbon nanotube powder produced by the same.

DESCRIPTION OF THE PREFERRED EMBODIMENTS

Preferred embodiments of a method and apparatus for processing carbon nanotubes (CNTs), and CNT dispersion liquid, CNT powder produced by the same according to the present invention will hereinafter be described in detail with reference to the accompanying drawings. It is noted that in the descriptions of the drawings, identical components are designated by the same reference numerals to omit redundant description. Also, the dimensional ratios in the drawings do not necessarily correspond to those in the descriptions.

Figure 1:
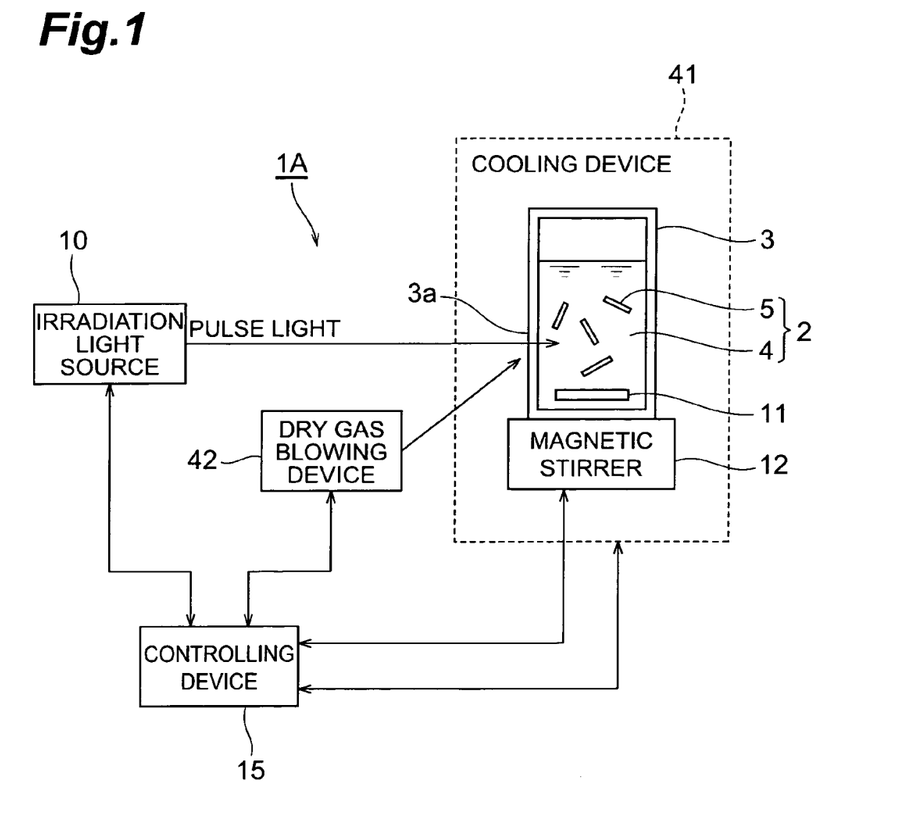
FIG. 1 is a block diagram schematically showing an embodiment of a CNT processing apparatus.

FIG. 1 is a block diagram schematically showing an embodiment of a CNT processing apparatus according to the present invention. The CNT processing apparatus 1A is an apparatus to fragment CNTs by applying optical processing to the to-be-processed liquid with CNT raw material being suspended in a liquid-phase solvent. The to-be-processed liquid 2 is composed of the liquid-phase solvent 4 and the CNT raw material 5 to be fragmented contained in the solvent 4. Also, as shown in FIG. 1, the processing apparatus 1A includes a processing chamber 3 for housing the to-be-processed liquid 2.

As the solvent 4 in which the CNT raw material 5 is suspended, there can be cited, for example, water, heavy water, ethanol, isopropyl alcohol, and dimethyl formamide, though not particularly restricted thereto. In general, the solvent 4 preferably employs a substance that cannot react chemically with the CNT raw material 5 only by mixing at an ordinary temperature and that is a poor solvent for CNTs. Also, as the material of the processing chamber 3, for example, glass and quartz can be used. In general, it is preferable to employ a material that has a high transparency for light to be applied to the to-be-processed liquid 2 and that cannot react chemically with the solvent 4. Further, as for the shape of the processing chamber 3, it is preferable to employ a shape with a small number of joints such as sphere or cylinder in terms of durability, etc., though not particularly restricted thereto.

In the processing chamber 3, there is housed a magnetic stick 11 together with the to-be-processed liquid 2. The magnetic stick 11 and a magnetic stirrer 12 are used to stir the solvent 4 of the to-be-processed liquid 2 and the CNT raw material 5 in the processing chamber 3 to disperse the CNT raw material 5 in the solvent 4.

The processing apparatus 1A also includes an irradiation light source 10 for applying pulse light having a predetermined wavelength to the to-be-processed liquid 2 housed in the processing chamber 3. The irradiation light source 10 provides pulse light having a wavelength preferable for fragmentation of the CNT raw material 5 in the solvent 4 of the to-be-processed liquid 2. As the pulse irradiation light source 10, there can be employed various light sources such as a laser light source, semiconductor LD, LED, and lamp light source as long as satisfying the irradiation conditions required for CNT fragmentation.

The pulse light preferably has a wavelength preferable for fragmentation of the CNT raw material in consideration of, for example, the dependence property of the interaction between a substance and light on the size of the substance, and will specifically be described hereinafter. Light in a wavelength range including a wavelength preferable for fragmentation may also be used. Further, in the case where there is a problem in that a photochemical reaction of CNTs occurs, the pulse light preferably has a wavelength of 900 nm or more to prevent photochemical reaction. However, in order to utilize the energy of the pulse light effectively for CNT processing, it is preferable to avoid the use of light having a wavelength in the infrared absorbance range of the solvent 4 and the processing chamber 3, etc.

Also, in the case of using a pulse laser light source as the irradiation light source 10, a wavelength fixed laser light source may be used for the laser light source if the wavelength to be set for laser light is preliminarily known. Alternatively, a wavelength variable laser light source may be used. In this case, laser light having an adequate wavelength can be set and applied appropriately depending on, for example, the processing characteristics when fragmenting the CNT raw material. There may also be provided light intensity adjusting means such as an attenuation filter or an optical attenuator for the pulse irradiation light source 10, if necessary.

There is also installed a cooling device 41 as cooling means for cooling and keeping the to-be-processed liquid 2 at low temperature outside the processing chamber 3. It is possible to prevent the occurrence of a thermal chemical reaction between CNTs and the solvent 4 and thereby to perform CNT fragmentation suitably by applying pulse light from the irradiation light source 10 while cooling the to-be-processed liquid 2 with CNTs being dispersed in the solvent 4. In general, it is preferable to cool the to-be-processed liquid 2 so as not to be equal to or more than the ordinary temperature even if pulse light may be applied to the processing chamber 3 for a long time. It is noted that the cooling device 41 is schematically shown in FIG. 1.

The front surface portion of the processing chamber 3 that faces the pulse irradiation light source 10 serves as a pulse light incident portion 3a. In order to prevent long-term dew condensation at the outer surface of the pulse light incident portion 3a and thereby inhibition of pulse light irradiation under good conditions when the to-be-processed liquid 2 and the processing chamber 3 are kept at low temperature, there is also installed a dry gas blowing device 42 for blowing dry gas against the outer surface of the pulse light incident portion 3a to prevent dew condensation. As the dry gas, there may be used, for example, dry air after passing through a dry silica gel layer by a pump. Alternatively, nitrogen gas, etc., may be used.

The irradiation light source 10 is connected to a controlling device 15 including a computer, etc. In the present embodiment, the controlling device 15 is also connected to the magnetic stirrer 12, the cooling device 41, and the dry gas blowing device 42. By controlling the operation of each component of the above-described processing apparatus 1A, the controlling device 15 controls the fragmentation processing of the CNT raw material 5.

Next will be described a CNT processing method according to the present invention using the CNT processing apparatus 1A shown in FIG. 1.

First, a liquid-phase solvent 4 such as water and CNT raw material 5 to be subject to fragmentation processing are mixed and arranged to prepare to-be-processed liquid 2 with the CNT raw material 5 being suspended in the solvent 4, and then the to-be-processed liquid 2 is introduced into the processing chamber 3 (preparing step). Next, if the to-be-processed liquid 2 is required to be kept at low temperature, the liquid is cooled to be a predetermined temperature using the cooling device 41. Also, the dry gas blowing device 42 blows dry gas against the processing chamber 3 to prevent dew condensation of the pulse light incident portion 3a. Then, the magnetic stirrer 12 is operated to cause the magnetic stick 11 to stir the to-be-processed liquid 2 and disperse the CNT raw material 5 in the solvent 4.

Subsequently, the controlling device 15 controls the pulse irradiation light source 10 to cause pulse light having a wavelength set depending on, for example, the size of the CNT raw material 5 to be applied from the irradiation light source 10 to the to-be-processed liquid 2. Thus applying pulse light allows the CNTs in the solvent 4 to be fragmented in the to-be-processed liquid 2 in the processing chamber 3 (fragmenting step).

Effects of the CNT processing method and apparatus according to the present embodiment will be described.

In accordance with the above-described CNT processing method and apparatus, the to-be-processed liquid 2 containing the CNT raw material 5 to be fragmented in the solvent 4 and housed in the processing chamber 3 is exposed to the pulse light to perform CNT fragmentation processing. This allows for efficient fragmentation of the CNTs.

That is, in such a processing method, setting the wavelength of pulse light for fragmentation processing to be a predetermined wavelength sufficiently greater than the diameter of CNTs allows the interaction between the CNT raw material 5 and the light to be increased only in the length direction of the CNTs. This effect allows the CNTs to be fragmented selectively in the length direction thereof by applying pulse light. Also, in accordance with dispersion liquid with CNTs processed and fragmented by the above-described processing method being dispersed in the solvent, it is possible to obtain dispersion liquid of efficiently processed CNTs in an excellent state (CNT fragments suspended liquid).

The wavelength of the above-described pulse light is preferably 20 times or more the diameter of the CNTs. This allows the efficiency of the above-described CNT fragmentation to be improved. Also, the wavelength of the pulse light is more preferably 50 times or more the diameter of the CNTs.

In addition, the irradiation light intensity of the pulse light is preferably equal to or greater than $0.01$ $J/cm^2$·pulse but equal to or smaller than $2.0$ $J/cm^2$·pulse. Applying pulse light at such intensity allows the CNT fragmentation to be performed sufficiently. Also, the irradiation light intensity of the pulse light is more preferably equal to or greater than $0.1$ $J/cm^2$·pulse but equal to or smaller than $0.7$ $J/cm^2$·pulse. It is noted that the above range of irradiation light intensity is effective especially when the pulse light has a pulse width of about 5 ns. As for the irradiation light intensity of pulse light to be applied to the to-be-processed liquid 2, it is preferable to set a suitable intensity and intensity range in consideration of other conditions such as the pulse width thereof.

Also, the above-described CNT processing method may further include the step of removing the solvent 4 to obtain fragmented CNTs in a powdered state. In this case, if an additive agent is added to the to-be-processed liquid 2, it is preferable to remove the additive agent together with the solvent 4. Also, in accordance with CNT powder processed by the above-described processing method with the solvent, etc., being removed therefrom, it is possible to obtain powder of efficiently processed CNT fragments in an excellent state.

As specific methods for removing the solvent, etc., for example, spray drying method and freeze drying method can be used. The spray drying method is a method for spraying and drying the to-be-processed liquid 2. The freeze drying method is a method for freezing and subliming the to-be-processed liquid 2. The removing of the additive agent can be achieved by, for example, adding further solvent 4 to the to-be-processed liquid 2 to dilute the additive agent and separating the CNTs from the solvent by centrifugal separation, and then repeating the diluting and separating operations multiple times.

Also, in the CNT fragmentation processing by pulse light irradiation, it is preferable to add a surfactant to the solvent 4 in the to-be-processed liquid 2, which is used to be processed. If the solvent 4 for CNTs is a poor solvent, there is a possibility of CNT aggregation, where aggregated CNTs, if occurred, make it difficult to perform processing sufficiently by pulse light irradiation. In this case, it is possible to prevent CNT aggregation by adding the surfactant to the solvent 4.

It is also preferable to add a polymer soluble in the solvent 4 to the solvent 4 in the to-be-processed liquid 2. Thus adding such a polymer allows damaging of the lateral sides of CNTs by optical processing to be reduced. Both the surfactant and the polymer may also be added to the solvent 4, if necessary.

As the surfactant, there can be cited, for example, fatty acid salt, α-sulfonate fatty acid ester salt, alkylbenzene sulfonate salt, alkyl sulfate salt, alkyl ether sulfate ester salt, alkylsulfate triethanolamine, fatty acid diethanolamide, polyoxyethylene alkyl ether, polyoxyethylene alkyl phenyl ether, alkyl trimethylammonium salt, dialkyl dimethylammonium chloride, alkyl pyridinium chloride, alkyl carboxybetaine, polyoxyethylene sorbitan fatty acid ester, and sodium dodecyl sulfate (SDS), if the solvent 4 is water.

Also, as the polymer, there can be cited, for example, polyvinyl alcohol, polyacrylic polymer, polyacrylamide, polyethylene oxide, polyethylene glycol, polyvinyl pyrrolidone, and glycerin, if the solvent 4 is also water.

Figure 2:
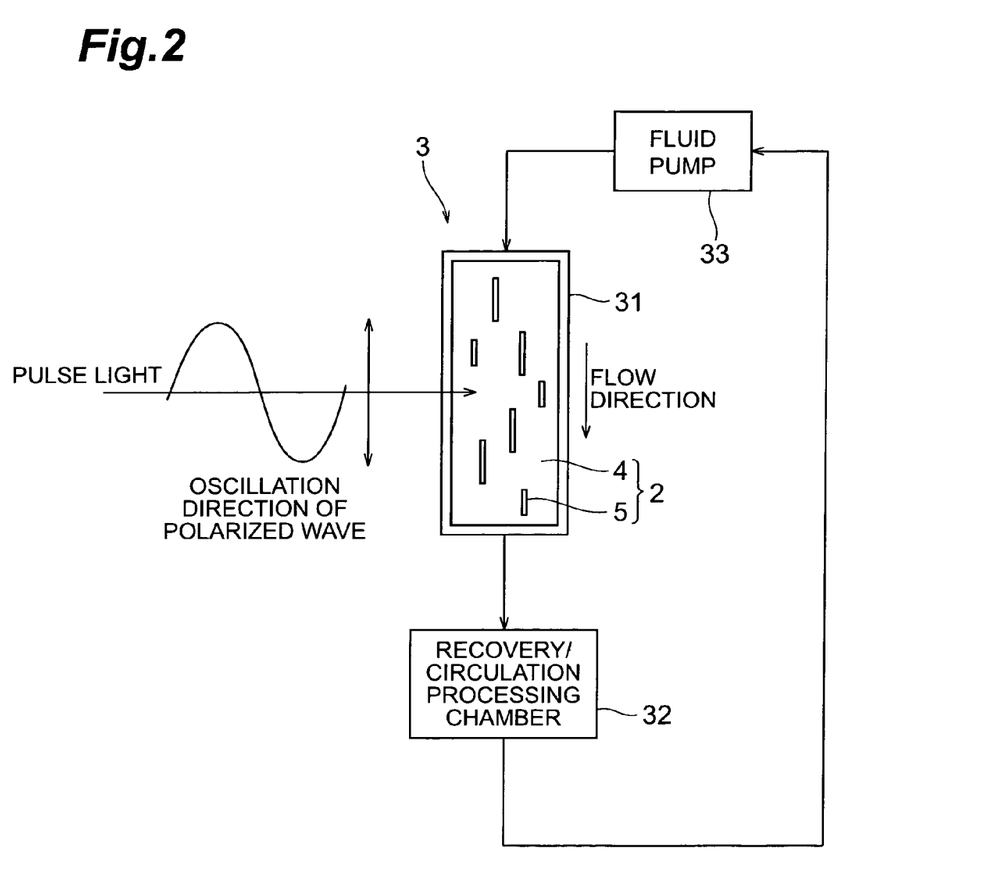
FIG. 2 is a block diagram partially showing an exemplary variation of the CNT processing apparatus shown in FIG. 1.

Further, when fragmenting CNTs by applying pulse light to the to-be-processed liquid 2, in an irradiation area where the pulse light is applied, the CNTs are preferably aligned in a predetermined direction with respect to the polarization plane of the pulse light. It is noted here that in the above-described processing method, the interaction between the pulse light and the CNTs is maximized when the oscillation direction of the polarized wave of the pulse light is parallel with the length direction of the CNTs as shown in FIG. 2. That is, the above-described fragmentation effect by pulse light irradiation depends on the relationship between the oscillation direction of polarized wave and the direction of the CNTs. It is therefore possible to improve the efficiency of the fragmentation processing by aligning the CNTs in a predetermined direction with respect to the polarization plane of the pulse light.

In the case above, in the processing apparatus 1A shown in FIG. 1, the processing chamber 3 is preferably arranged in such a manner that in an irradiation area of the pulse light, the CNTs are aligned in a predetermined direction with respect to the polarization plane of the pulse light. There is specifically a method of aligning the direction of the CNTs utilizing, for example, a fluid effect. In this case, the processing chamber 3 is preferably arranged in such a manner that the to-be-processed liquid 2 is brought into a laminar flow state to align the direction of the CNTs. There is alternatively a method of aligning the direction of the CNTs utilizing, for example, an electromagnetic effect. In this case, the processing chamber 3 is preferably arranged in such a manner that the to-be-processed liquid 2 is applied with an electric field to align the direction of the CNTs.

FIG. 2 is a block diagram partially showing an exemplary variation of the CNT processing apparatus shown in FIG. 1. The present exemplary variation shows an example of an arrangement when aligning the direction of the CNTs utilizing a fluid effect. In FIG. 2, in order to align the direction of the CNTs in the irradiation area where the pulse light is applied, the processing chamber 3 consists separately of a light irradiation processing chamber 31 and a recovery/circulation processing chamber 32. Also, a fluid pump 33 for circulating the to-be-processed liquid 2 in a circulation flow path including the processing chambers 31 and 32 is connected to the processing chambers 31 and 32.

The light irradiation processing chamber 31 is used in a laminar flow state with a Reynolds number of 2300 or less, which is determined in accordance with the cross-sectional shape of the flow path and the flow rate. In such a laminar flow state, the CNTs in the solvent 4 are aligned in the flow direction by a fluid effect as shown in FIG. 2. The CNTs after being fragmented in the light irradiation processing chamber 31 are sent to the following recovery/circulation processing chamber 32. Also, in the case of requiring multiple times of optical processing, the to-be-processed liquid 2 can be circulated by the fluid pump 33 to be processed repeatedly.

Figure 3:
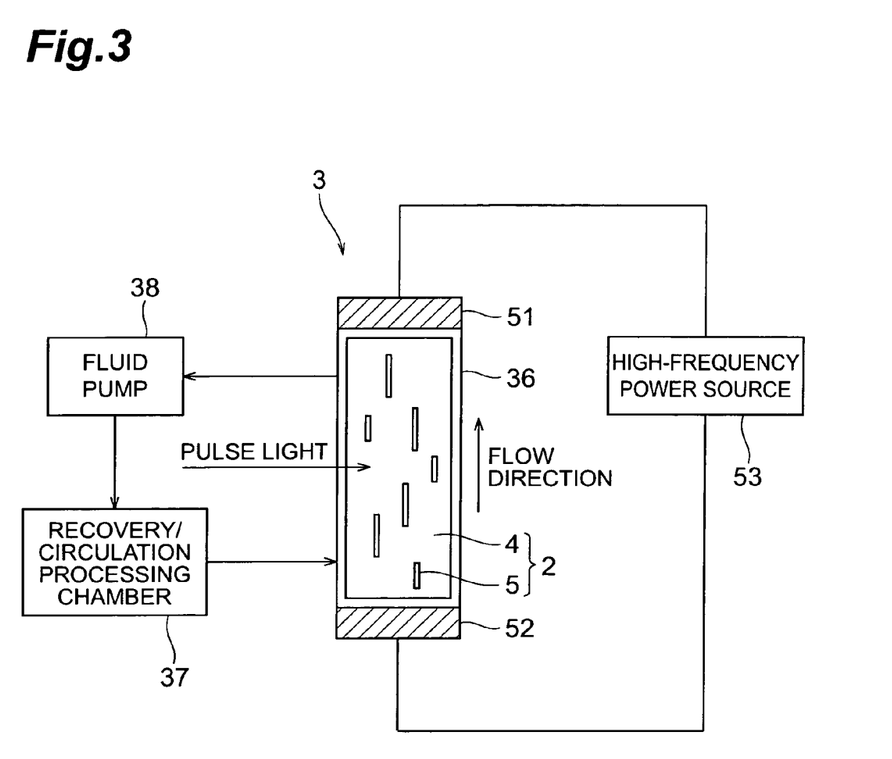
FIG. 3 is a block diagram partially showing another exemplary variation of the CNT processing apparatus shown in FIG. 1.

FIG. 3 is a block diagram partially showing another exemplary variation of the CNT processing apparatus shown in FIG. 1. The present exemplary variation shows an example of an arrangement when aligning the direction of the CNTs utilizing an electromagnetic effect. In FIG. 3, the processing chamber 3 consists separately of a light irradiation processing chamber 36 and a recovery/circulation processing chamber 37, as is the case with the arrangement shown in FIG. 2. Also, a fluid pump 38 for circulating the to-be-processed liquid 2 in a circulation flow path including the processing chambers 36 and 37 is connected to the processing chambers 36 and 37.

In the light irradiation processing chamber 36, there are provided a pair of electrodes 51 and 52 in positions facing each other with respect to the flow direction therein. The electrodes 51 and 52 are also connected with a high-frequency power source 53. In such an arrangement, applying an electric field to the to-be-processed liquid 2 in the processing chamber 36 using the high-frequency power source 53 allows the direction of the CNTs to be aligned by an electromagnetic effect. In this case, the high-frequency power source 53 preferably has a high frequency of 1 to 10 MHz in terms of avoiding an electrolytic effect.

Next, the present invention will be described more specifically with reference to a practical example, though the present invention is not restricted to the following example.

In the present example, four kinds of CNTs were used as the CNTs to be fragmented, that is, single-walled carbon nanotubes (SWCNTs) having a diameter of 2 nm and multi-walled carbon nanotubes (MWCNTs) having a diameter, respectively, of 20, 60, and 100 nm. Water was used as the liquid-phase solvent 4, and the water temperature was adjusted to be 15° C. Also, 0.1 wt % of sodium dodecyl sulfate (SDS) was added as the surfactant. Then, each CNT sample was suspended in a cylindrical cell that functions as the processing chamber at a concentration of 1 mg/mL.

The cylindrical cell was fed with 10 mL of each sample liquid. Also, in order to prevent each CNT sample from being deposited by stirring, a magnetic stick was installed and the liquid was stirred constantly using a magnetic stirrer to keep each sample being suspended. It is noted that although no operation for controlling the direction of each CNT sample was performed in the present experiment, it is clear from the dependence property of the interaction between a substance and light on the size as mentioned above that aligning the direction improves the efficiency and uniformity of optical processing.

Also, pulse light for fragmenting each CNT raw material had irradiation conditions of: a wavelength of 1064 nm; a pulse light spot diameter of ϕ5 mm; a pulse width FWHM of 5 ns; a repetition frequency of 10 Hz; an irradiation time of 30 minutes; and an irradiation light intensity of 0 to 4 J/cm$^2$·pulse to perform an optical processing experiment based on the above-described processing method.

Figure 4:
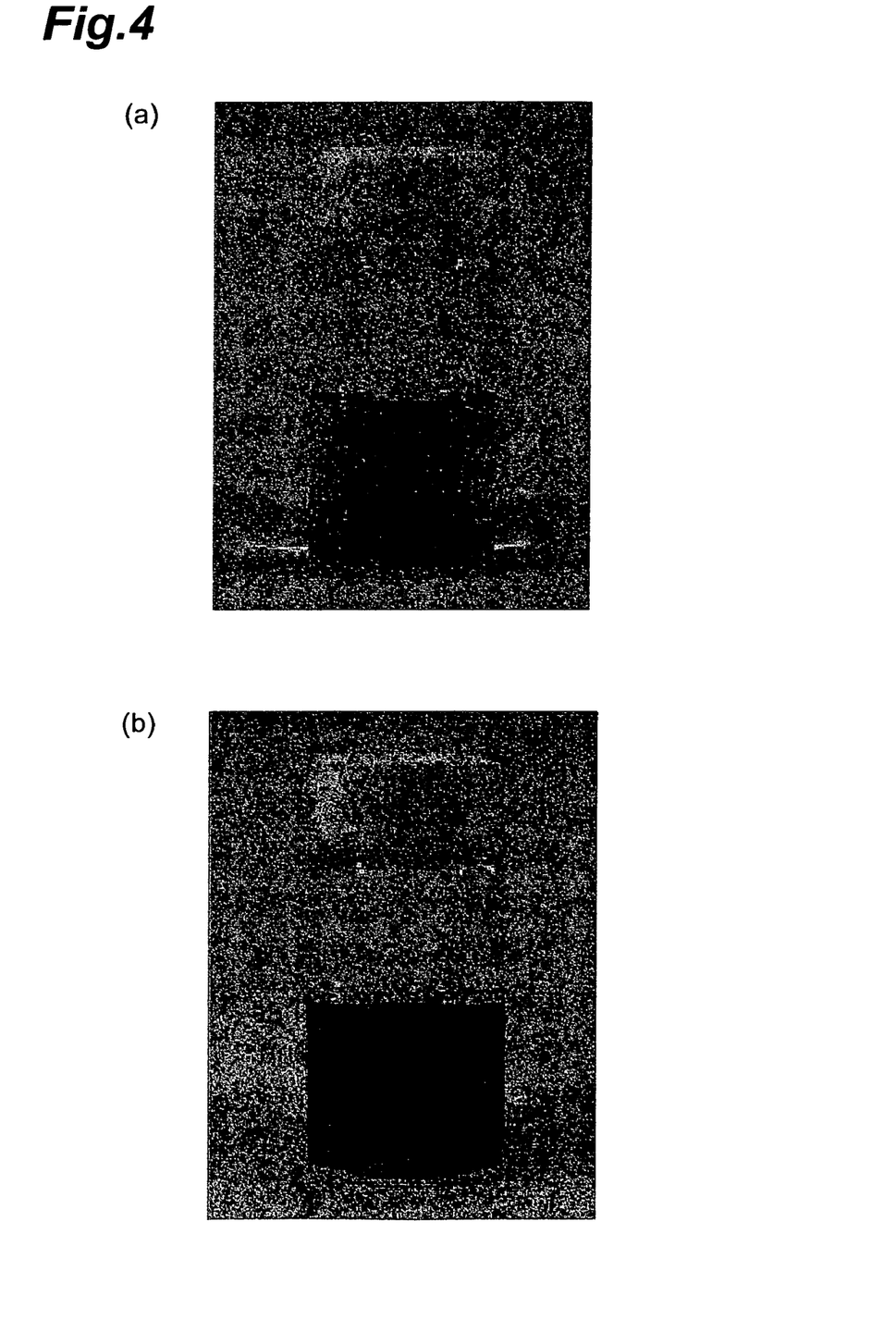
FIG. 4 is a view showing the state of to-be-processed liquid (a) before and (b) after CNT fragmentation processing by pulse light irradiation.

FIG. 4 is a view showing the state of the to-be-processed liquid (a) before and (b) after the CNT fragmentation processing by pulse light irradiation. As shown in the states (a) and (b), significant changes in the suspended state of the CNTs in each to-be-processed liquid were found between before and after the processing at an irradiation light intensity of 0.05 J/cm$^2$·pulse as a threshold value. In addition, among the above-described four kinds of samples, the sample having a smaller diameter tends to show slightly higher irradiation light intensity as a threshold value. It is noted that FIG. 4 shows an example where MWCNT samples having a diameter of 20 nm were used to perform fragmentation processing at an irradiation light intensity of 0.5 J/cm$^2$·pulse.

Figure 5:
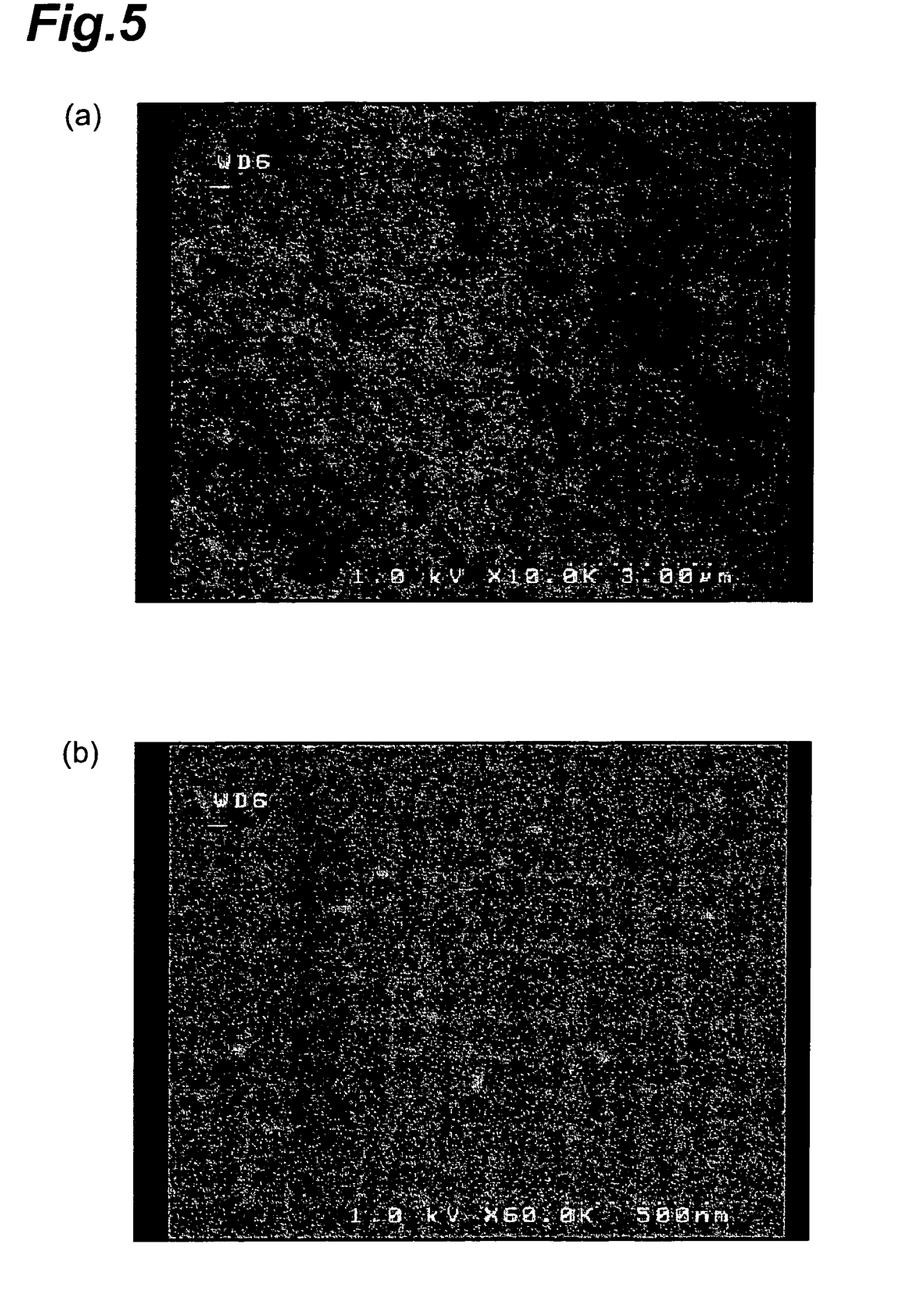
FIG. 5 is a view showing SEM observation images of a CNT sample (a) before and (b) after CNT fragmentation processing by pulse light irradiation.

Next, the state of the CNTs contained in each dispersion liquid before and after the processing was compared using a scanning electron microscope (SEM). FIG. 5 is a view showing SEM observation images of a CNT sample (a) before and (b) after CNT fragmentation processing by pulse light irradiation. It is noted here that each CNT dispersion liquid was dropped and dried on a base plate to observe each CNT sample using the SEM. It was consequently found that before the fragmentation processing, CNTs were bundled or entangled as shown in the observation image (a), while after the processing, CNTs were changed into fragments having a length of 20 to 100 nm and a width of 20 nm as shown in the observation image (b). That is, it was confirmed that CNT fragmentation by pulse light irradiation had been achieved. It is noted that FIG. 5 shows an example where MWCNT samples having a diameter of 20 nm were used to perform fragmentation processing at an irradiation light intensity of 0.5 J/cm$^2$·pulse, as is the case in FIG. 4.

Figure 6:
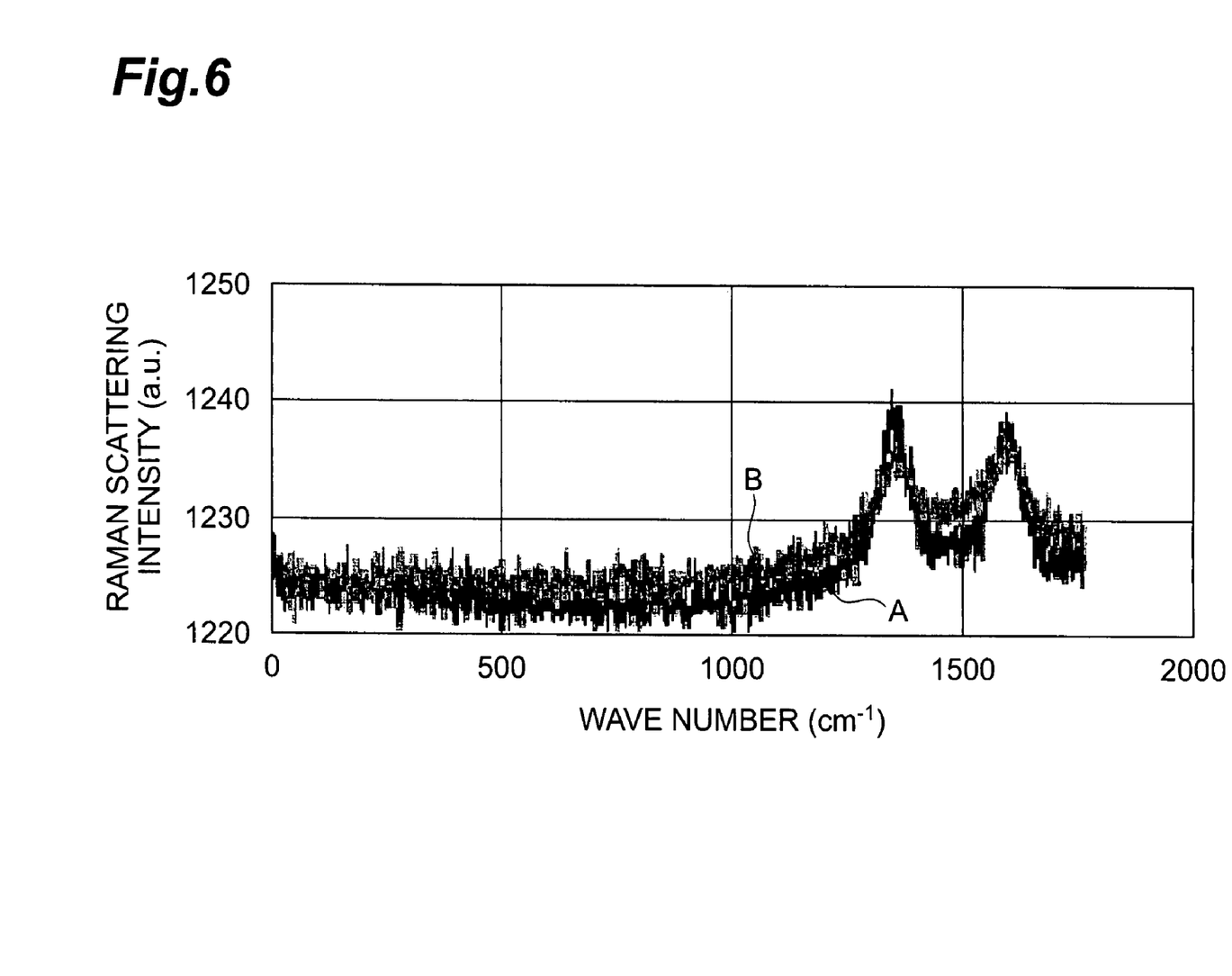
FIG. 6 is a graph showing the dependence property of Raman scattering intensity on a wave number obtained for a CNT sample.
Figure 7:
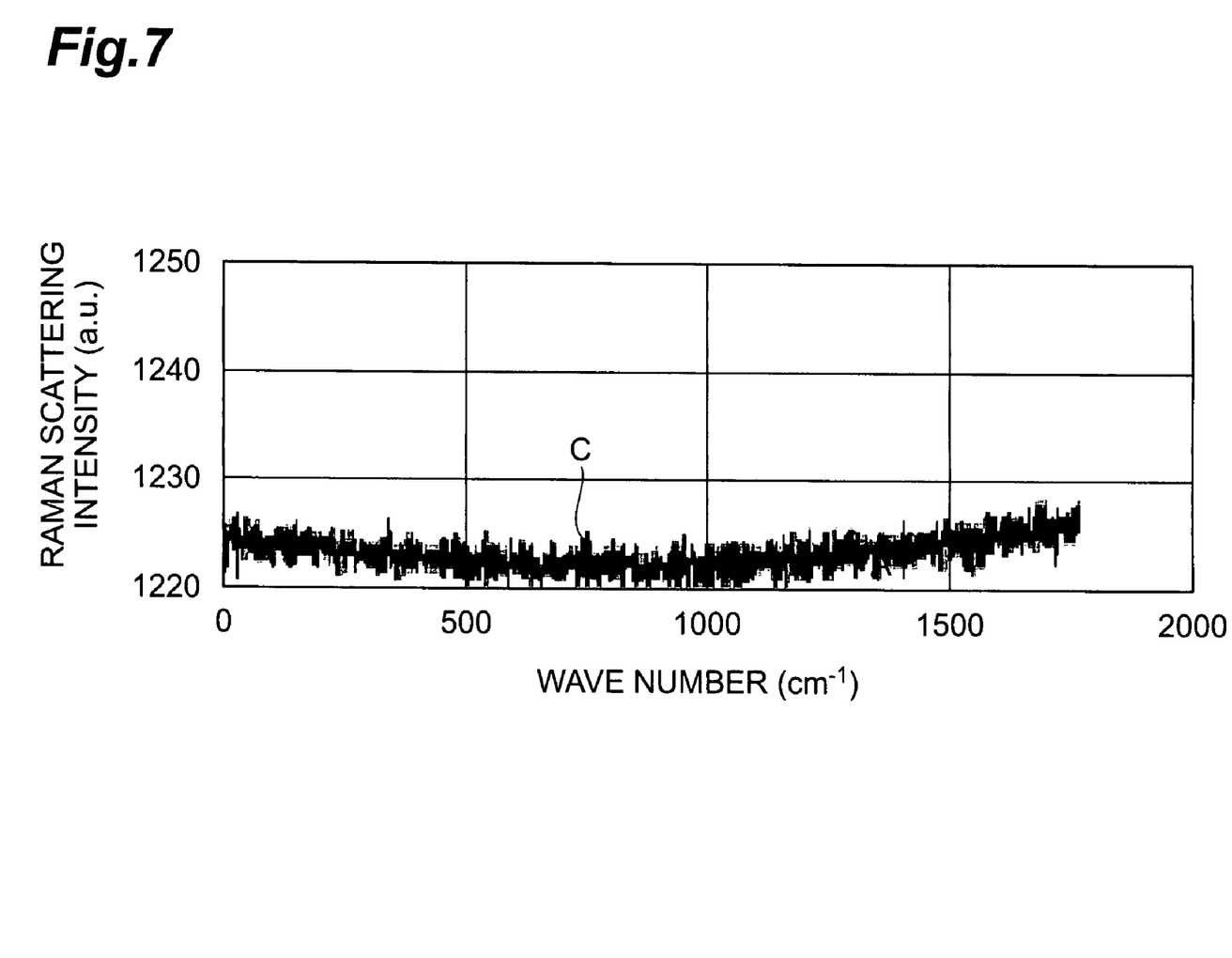
FIG. 7 is a graph showing the dependence property of Raman scattering intensity on a wave number obtained for a CNT sample.

Next, the effects of the shape and structure of CNTs on the irradiation light intensity of pulse light were examined using the SEM and Raman scattering spectroscopy. FIG. 6 and FIG. 7 are graphs, respectively, showing the dependence property of Raman scattering intensity on a wave number obtained for CNT samples. It is noted here that the graph A in FIG. 6 shows a Raman scattering spectrum for the CNT raw material. The graph B in FIG. 6 shows a Raman scattering spectrum for CNT samples when MWCNTs having a diameter of 20 nm were fragmented at an irradiation light intensity of 0.5 J/cm$^2$·pulse. Also, the graph C in FIG. 7 shows a Raman scattering spectrum for CNT samples when MWCNTs having a diameter of 20 nm were fragmented at an irradiation light intensity of 2.17 J/cm$^2$·pulse.

As indicated by the graph B in FIG. 6, in the case of CNT samples fragmented under good conditions, two Raman scattering peaks due to CNT structure were observed, as is the case with the graph A for the CNT raw material. Meanwhile, as indicated by the graph C in FIG. 7, in the case of CNT samples fragmented at an irradiation light intensity of more than 2.0 J/cm$^2$·pulse, the foregoing two Raman scattering peaks due to CNT structure disappeared. These trends were shown also in the case of SWCNTs having a diameter of 2 nm. Further, in the case of CNT samples having a diameter of 60 and 100 nm, the Raman scattering peaks disappeared at an irradiation light intensity of more than 0.7 J/cm$^2$·pulse.

As mentioned above, in the case of using irradiation light of 1064 nm, the range of irradiation light intensity within 0.05 to 2.0 J/cm$^2$·pulse is a suitable optical processing condition for the CNT samples having a diameter of 2 and 20 nm. Further, the range of irradiation light intensity within 0.1 to 0.7 J/cm$^2$·pulse is a suitable optical processing condition to include CNT samples having a greater diameter. Also, in the case of using ultraviolet light, since the absorbance of samples increases to reduce the threshold value for fragmentation to be about 0.01, the range of irradiation light intensity within 0.01 to 2.0 J/cm²·pulse is a suitable optical processing condition.

Next, the effects of the diameter of CNTs on the above-described optical processing were examined. As a result of observing the fragments of each CNT sample in detail using the SEM, in the case of pulse light having a wavelength of 1064 nm, the CNTs having a diameter of 20 nm or less were better fragmented in the length direction thereof. That is, it can be considered that in the case of CNT samples having a diameter of 60 and 100 nm, since the optical effect in the radial direction is increased, the lateral sides of the CNTs are partially broken parallel with the fragmentation in the length direction.

As mentioned above, in the above-described CNT processing method, the wavelength of the pulse light is preferably 20 times or more the diameter of the CNTs, and more preferably 50 times or more the diameter of the CNTs. However, even if pulse light having a wavelength shorter than that may be used, CNT fragmentation processing can be performed.

The method and apparatus for processing carbon nanotubes, carbon nanotube dispersion liquid, and carbon nanotube powder according to the present invention are not restricted to the above-described embodiment or example, and various modifications may be made. For example, the processing apparatus 1A shown in FIG. 1 may be arranged in such a manner that the cooling of the to-be-processed liquid 2 using the cooling device 41 and the stirring of the to-be-processed liquid 2 using the magnetic stick 11 and the magnetic stirrer 12 are not performed if not necessary.

Figure 8:
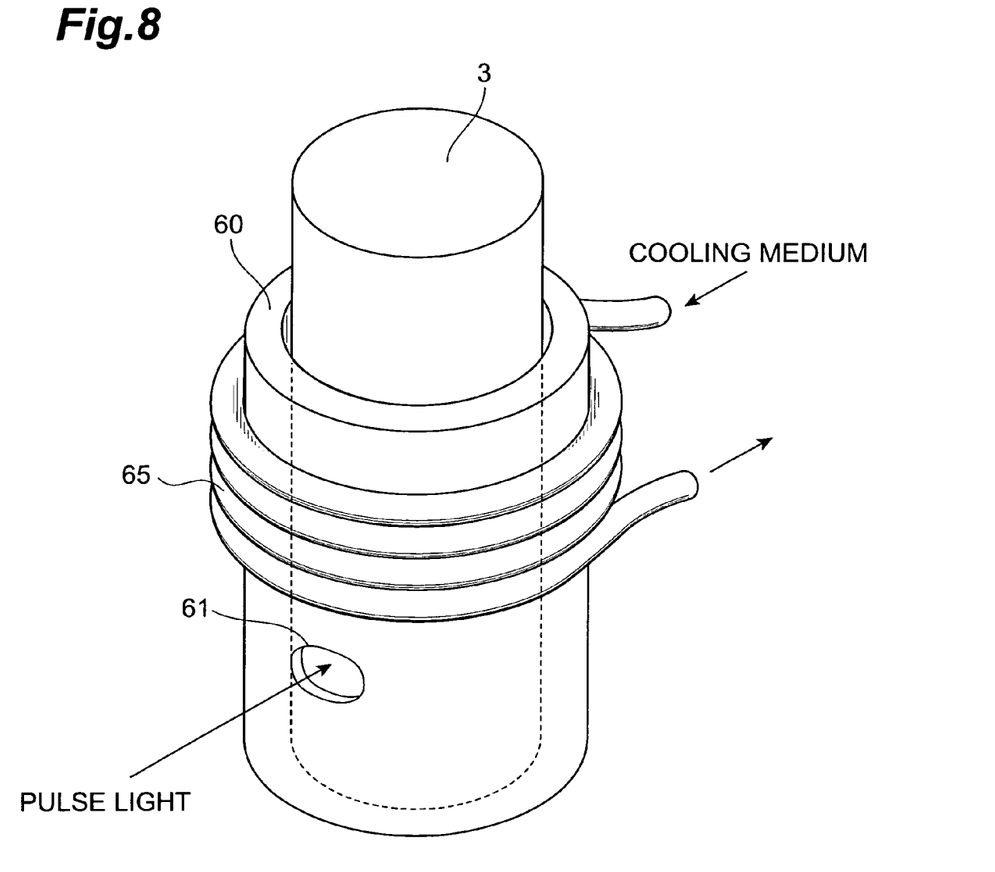
FIG. 8 is a perspective view showing an example of a cooling device used in the CNT processing apparatus shown in FIG. 1.

In addition, the cooling device 41 in the processing apparatus 1A shown in FIG. 1 may employ the arrangement shown in FIG. 8, for example. FIG. 8 is a perspective view showing an example of a cooling device used in the processing apparatus shown in FIG. 1. In the present arrangement example, a cylindrical processing chamber 3 is inserted into a cooling holder 60 that is made of a material having a high heat conductivity, and to-be-processed liquid 2 is cooled by flowing cooling medium through a cooling hose 65 placed around the cooling holder 60. Also, in a predetermined position of the cooling holder 60, there is provided a pulse light incident hole 61 to be used for pulse light irradiation, whereby it is possible to apply pulse light to the to-be-processed liquid 2 while being cooled.

The method for processing carbon nanotubes according to the above-described embodiment is here arranged in such a manner as to include the steps of: preparing to-be-processed liquid with carbon nanotubes as raw material being suspended in a solvent; and fragmenting the carbon nanotubes in the solvent in the length direction thereof by exposing the to-be-processed liquid to pulse light having a predetermined wavelength.

The apparatus for processing carbon nanotubes according to the above-described embodiment is also arranged in such a manner as to include: a processing chamber for housing to-be-processed liquid with carbon nanotubes as raw material being suspended in a solvent; and an irradiation light source for applying pulse light having a predetermined wavelength for fragmentation of the carbon nanotubes in the solvent to the to-be-processed liquid housed in the processing chamber.

In addition, the wavelength of the pulse light to be applied to the to-be-processed liquid for fragmentation processing is preferably 20 times or more the diameter of the CNTs. Thus setting the wavelength of the pulse light sufficiently greater than the diameter of the CNTs allows the efficiency of selective fragmentation in the length direction of the CNTs to be improved. Also, the wavelength of the pulse light is more preferably 50 times or more the diameter of the CNTs. Further, the pulse light preferably has a wavelength of 900 nm or more.

The irradiation light intensity of the pulse light is preferably equal to or greater than 0.01 J/cm²·pulse but equal to or smaller than 2.0 J/cm²·pulse. Applying pulse light at such intensity allows the CNT fragmentation to be performed sufficiently. Also, the irradiation light intensity of the pulse light is more preferably equal to or greater than 0.1 J/cm²·pulse but equal to or smaller than 0.7 J/cm²·pulse.

Also, in the CNT fragmentation processing by pulse light irradiation, it is preferable to add a polymer soluble in the solvent to the solvent in the to-be-processed liquid, which is used to be processed. It is also preferable to add a surfactant to the solvent.

Further, the to-be-processed liquid is preferably cooled to be exposed to the pulse light in the fragmenting step of the processing method. Similarly, the processing apparatus preferably includes cooling means for cooling the to-be-processed liquid. This allows the CNT fragmentation to be performed suitably.

Also, in the processing method, in an irradiation area where the pulse light is applied, the CNTs are preferably aligned in a predetermined direction with respect to the polarization plane of the pulse light. As a specific method if it is required to align the polarization plane of the pulse light, there is a method of aligning the polarization plane of the pulse light though a polarizer, for example, a polarizing filter. Similarly, in the processing apparatus, the processing chamber is preferably arranged in such a manner that in an irradiation area where the pulse light is applied, the CNTs are aligned in a predetermined direction with respect to the polarization plane of the pulse light.

There is specifically a method of aligning the direction of the CNTs utilizing, for example, a fluid effect. In this case, the processing chamber is preferably arranged in such a manner that the to-be-processed liquid is brought into a laminar flow state to align the direction of the CNTs. There is alternatively a method of aligning the direction of the CNTs utilizing an electromagnetic effect. In this case, the processing chamber is preferably arranged in such a manner that the to-be-processed liquid is applied with an electric field to align the direction of the CNTs.

Also, dispersion liquid according to the above-described embodiment is preferably provided with CNTs processed and fragmented by the above-described processing method being dispersed in the solvent. In accordance with such dispersion liquid, it is possible to obtain dispersion liquid of efficiently processed CNT fragments in an excellent state.

The CNT processing method may further include the step of removing the solvent to obtain fragmented CNTs in a powdered state. In this case, if an additive agent is added to the to-be-processed liquid, it is preferable to remove the additive agent together with the solvent. As specific methods for removing the solvent, etc., for example, a spray drying method and freeze drying method can be used.

In addition, CNT powder according to the above-described embodiment is preferably processed by the above-described processing method with the solvent, etc., being removed therefrom. In accordance with such powder, it is possible to obtain powder of efficiently processed CNT fragments in an excellent state.

The present invention is applicable as a method and apparatus for processing carbon nanotubes that can fragment CNT raw material efficiently, and carbon nanotube dispersion liquid and carbon nanotube powder produced by the same. In accordance with such CNT fragmentation processing, it is possible to improve the uniformity of the material and bring out the unit-based characteristics of CNTs, which is expected to contribute to material provision for advanced CNT application.

What is claimed is:

1. A method for processing carbon nanotubes comprising the steps of:
preparing to-be-processed liquid with carbon nanotubes as raw material being suspended in a solvent;
introducing a substantially continuous flow of the to-be-processed liquid through a light irradiation processing chamber;
fragmenting the carbon nanotubes in the solvent in the length direction thereof by exposing the to-be-processed liquid as the to-be-processed liquid flows through the light irradiation processing chamber to pulse light having a predetermined wavelength; while the to-be-processed liquid is being stirred by a stirring means
sending the to-be-processed liquid, after being exposed to the pulse light, to a recovery/circulation processing chamber adapted to receive the flow of the to-be-processed liquid; and
circulating the to-be-processed liquid in a circulation flow path including the light irradiation processing chamber and the recovery/circulation processing chamber.

2. The processing method according to claim 1, wherein the wavelength of the pulse light is 20 times or more the diameter of the carbon nanotubes and not less than 900 nm.

3. The processing method according to claim 1, wherein the irradiation light intensity of the pulse light is equal to or greater than 0.01 J/cm$^2$·pulse but equal to or smaller than 2.0 J/cm$^2$·pulse.

4. The processing method according to claim 1, wherein a polymer soluble in the solvent is added to the solvent.

5. The processing method according to claim 1, wherein a surfactant is added to the solvent.

6. The processing method according to claim 1, wherein the to-be-processed liquid is cooled to be exposed to the pulse light in the fragmenting step.

7. The processing method according to claim 1, wherein in an irradiation area of the pulse light, the carbon nanotubes are aligned in a predetermined direction with respect to the polarization plane of the pulse light.

8. The processing method according to claim 1, further comprising the step of removing the solvent to obtain the fragmented carbon nanotubes in a powdered state.

9. An apparatus for processing carbon nanotubes comprising:
a light irradiation processing chamber adapted to receive a substantially continuous flow of a to-be-processed liquid with carbon nanotubes as raw material being suspended in a solvent;
an irradiation light source for applying pulse light having a predetermined wavelength for fragmentation of the carbon nanotubes in the solvent to the flow of the to-be-processed liquid flowing through the light irradiation processing chamber; while the to-be-processed liquid is being stirred by a stirring means
a recovery/circulation processing chamber adapted to receive the flow of the to-be-processed liquid after being exposed to the pulse light is sent; and
a fluid pump for circulating the to-be-processed liquid in a circulation flow path including the light irradiation processing chamber and the recovery/circulation processing chamber.

10. The processing apparatus according to claim 9, wherein the wavelength of the pulse light is 20 times or more the diameter of the carbon nanotubes and not less than 900 nm.

11. The processing apparatus according to claim 9, wherein the irradiation light intensity of the pulse light is equal to or greater than 0.01 J/cm$^2$·pulse but equal to or smaller than 2.0 J/cm$^2$·pulse.

12. The processing apparatus according to claim 9, further comprising cooling means for cooling the to-be-processed liquid.

13. The processing apparatus according to claim 9, wherein the light irradiation processing chamber is arranged in such a manner that in an irradiation area of the pulse light, the carbon nanotubes are aligned in a predetermined direction with respect to the polarization plane of the pulse light.

14. The processing apparatus according to claim 13, wherein the light irradiation processing chamber is arranged in such a manner that the to-be-processed liquid is brought into a laminar flow state to align the direction of the carbon nanotubes.

15. The processing apparatus according to claim 13, wherein the light irradiation processing chamber is arranged in such a manner that the to-be-processed liquid is applied with an electric field to align the direction of the carbon nanotubes.

16. Dispersion liquid with the carbon nanotubes processed and fragmented by the processing method according to claim 1 being dispersed in the solvent.

17. Carbon nanotube powder processed by the processing method according to claim 8.

18. A method for processing carbon nanotubes comprising the steps of:
preparing to-be-processed liquid with carbon nanotubes as raw material being suspended in a solvent;
substantially filling a light irradiation processing chamber with the to-be-processed liquid;
stirring the to-be-processed liquid filling the light irradiation processing chamber to disperse the carbon nanotubes in the solvent; and
fragmenting the carbon nanotubes in the solvent in the length direction thereof by exposing the to-be-processed liquid in the light irradiation processing chamber to pulse light having a predetermined wavelength while the to-be-processed liquid is being stirred by a stirring means.

19. An apparatus for processing carbon nanotubes comprising:
a light irradiation processing chamber adapted to be substantially filled with a to-be-processed liquid with carbon nanotubes as raw material being suspended in a solvent;
stirring means for stirring the to-be-processed liquid filling the light irradiation processing chamber to disperse the carbon nanotubes in the solvent; and
an irradiation light source for applying pulse light having a predetermined wavelength for fragmentation of the carbon nanotubes in the solvent of the to-be-processed liquid filling the light irradiation processing chamber while the to-be-processed liquid is being stirred by the stirring means.

* * * * *